United States Patent [19]

Sejpal

[11] 4,142,003

[45] Feb. 27, 1979

[54] NON-AEROSOL VEGETABLE OIL COMPOSITIONS CONTAINING LECITHIN AND PURE ETHYL ALCOHOL

[75] Inventor: Vasant D. Sejpal, Jersey City, N.J.

[73] Assignee: American Home Products Corporation, New York, N.Y.

[21] Appl. No.: 826,481

[22] Filed: Aug. 22, 1977

[51] Int. Cl.$^2$ ............................ A23D 5/00; A23J 7/02
[52] U.S. Cl. .................................... 426/601; 426/609; 426/662
[58] Field of Search ............... 426/116, 601, 609, 662; 260/403; 106/243

[56] References Cited

U.S. PATENT DOCUMENTS

| 2,963,372 | 12/1960 | Brody et al. | 426/609 |
| 3,443,966 | 5/1969 | Reid | 426/601 |

FOREIGN PATENT DOCUMENTS

| 241513 | 4/1960 | Australia | 426/116 |
| 1449272 | 9/1976 | United Kingdom | 426/116 |

Primary Examiner—Robert A. Yoncoskie
Attorney, Agent, or Firm—Joseph Martin Weigman

[57] ABSTRACT

The inclusion of 1 to 15 per cent by weight of pure ethyl alcohol (190° – 200° proof) in lecithin-vegetable oil compositions lowers the viscosity, provides a uniform one phase system, and renders high concentrations of lecithin compositions suitable for dispensing from non-aerosol, squeeze or spray bottles. Such compositions which contain relatively higher concentrations of lecithin may be used by the consumer in proportionally lesser amounts to achieve the same anti-stick properties or basting properties associated with the presently available products containing lower lecithin concentrations.

9 Claims, No Drawings

NON-AEROSOL VEGETABLE OIL COMPOSITIONS CONTAINING LECITHIN AND PURE ETHYL ALCOHOL

This invention relates to vegetable oil compositions containing lecithin. More particularly it relates to vegetable oil-lecithin compositions which are suitable for dispensing from non-aerosol pump bottles or squeeze bottles in a spray form.

It is an object of the present invention to provide a clear lecithin-vegetable oil composition which is suitable for dispensing in a non-aerosol, squeeze or pump, spray type container.

It is another object of the present invention to provide vegetable oil formulations containing high concentrations of lecithin which have the same viscosities as low concentration lecithin-vegetable oil formulations.

It is another object of the present invention to provide a uniform one phase system of vegetable oil, lecithin, and ethanol mixture which is suitable for dispensing in a non-aerosol type container without prior agitation.

It is a further object of the present invention to provide an anti-stick lecithin-vegetable oil composition which has higher anti-stick properties per unit weight than prior art formulations.

The objects of the present invention may be achieved with a product formulation which contains 1 to 15 percent by weight of pure ethyl alcohol along with lecithin in a vegetable oil mixture. Pure ethyl alcohol, for the purposes of this invention is ethanol of 190° to 200° proof which conforms with United States Pharmacopoeia (U.S.P.) standards for Alcohol and Dehydrated Alcohol, respectively. The 190° proof to 200° proof (absolute) ethanols are staple articles of commerce and are available, for instance, from U.S. Industrial Chemical Co. Ethanol of 200 U.S. proof degrees at 60° F. has a specific gravity of 0.79365, is 100 percent by weight of ethyl alcohol and contains no water. Ethanol of 190 U.S. proof degrees at 60° F. has a specific gravity of 0.81582, is 92.423 percent by weight of ethyl alcohol and contains 7.577 percent by weight of water. The 190° proof ethanol may be made by mixing 95 parts by volume of ethyl alcohol with 6.18 parts by volume of water. A shrinkage of volume occurs by mixing and results in 100 parts of 190° proof ethanol. Ethyl alcohol proof, by legal definition, is twice the percent by volume.

It has been found that the presence of 1 to 15 percent of pure ethyl alcohol reduces the viscosity of a vegetable oil-lecithin mixture, and provides a uniform one phase system. The phosphatides solids in lecithin have a higher specific gravity than vegetable oil, and upon prolonged standing (1 to 2 weeks) tend to separate out on the container bottom, in the absence of ethyl alcohol. The compositions of this invention are suitable for dispensing from non-aerosol, pump or squeeze containers. The problem does not arise in aerosol-lecithin compositions because lecithin is soluble in the freons.

The viscosity and solubility characteristics of various formulations of soybean oil, and 200° proof ethanol, with lecithin at 6 and 10 percent concentration were determined and are shown in Tables 1 and 2. The viscosity was determined with a Brookfield Synchroelectronic Viscosimeter model RVT using spindle #1. In the Tables all concentrations are given in percent by weight (w/o) and viscosities are stated in centipoises (cps).

From Tables 1 and 2 it was inferred that the critical range of lecithin was 3 to 12 percent and the critical range of pure ethyl alcohol was 1 to 15 percent. The viscosity and solubility characteristics were determined at those limits and are shown in Table 3.

TABLE I

| Formulation Ingredients | FORMULATIONS CONTAINING 6w/o LECITHIN | | | | | | | | | |
|---|---|---|---|---|---|---|---|---|---|---|
|  | 1 | 2 | 3 | 4 | 5 | 6 | 7 | 8 | 9 | 10 |
| Soybean oil | 100.0 | 0.0 | 94.0 | 89.0 | 84.0 | 79.0 | 77.0 | 74.0 | 69.0 | 59.0 |
| Lecithin (50% Phosphatide Solids) | 0.0 | 100.0 | 6.0 | 6.0 | 6.0 | 6.0 | 6.0 | 6.0 | 6.0 | 6.0 |
| 200° proof ethanol | 0.0 | 0.0 | 0.0 | 5.0 | 10.0 | 15.0 | 17.0 | 20.0 | 25.0 | 35.0 |
| TOTAL | 100.0 | 100.0 | 100.0 | 100.0 | 100.0 | 100.0 | 100.0 | 100.0 | 100.0 | 100.0 |
| Viscosity (cps) at 66° F | 75 | 1600 | 82 | 59 | 44 | 36 | 38 | 45 | 53 | 64 |
| at 82° F | 55 | — | 63 | 42 | 30 | — | — | — | — | — |
| Solubility Characteristics at 70° F | clear liquid | heavy viscous liquid | (a) | clear solution | clear solution | (b) | (c) | (c) | (c) | (c) |

TABLE 2

| Formulation Ingredients | FORMULATIONS CONTAINING 10w/o LECITHIN | | | | |
|---|---|---|---|---|---|
|  | 11 | 12 | 13 | 14 | 15 |
| Soybean Oil | 90.0 | 80.0 | 75.0 | 70.0 | 60.0 |
| Lecithin (50% Phosphatide solids) | 10.0 | 10.0 | 10.0 | 10.0 | 10.0 |
| 200° proof ethanol | — | 10.0 | 15.0 | 20.0 | 30.0 |
| TOTAL | 100.0 | 100.0 | 100.0 | 100.0 | 100.0 |
| Viscosity (cps) at 66° F | 87 | 54 | 44 | 50 | 60 |
| solubility characteristics of 70° F | (a) | clear solution | (b) | (c) | (c) |

(a) Clear initially. After prolonged standing, (approx. 2 wks), phosphatides solids separate out on bottom. Upon shaking, solution turns cloudy.
(b) Cloudy initially. Turns clear (begin to see slight separation of alcohol on a surface). This appears to be the maximum limit of alcohol that can be incorporated into the formulation.
(c) Cloudy initially. After 4–6 hours, turns less cloudy and a distinct alcohol layer appears on the surface. Upon shaking, turns cloudy.

TABLE 3

| Formulation | FORMULATIONS CONTAINING CRITICAL LIMITS OF LECITHIN AND ETHANOL | | | | | |
|---|---|---|---|---|---|---|
|  | 16 | 17 | 18 | 19 | 20 | 21 |
| Ingredients |  |  |  |  |  |  |
| Soybean Oil | 100.0 | 0.00 | 96.0 | 82.0 | 87.0 | 73.0 |
| Lecithin (50% Phosphatides) | 0.00 | 100.0 | 3.0 | 3.0 | 12.0 | 12.0 |
| Ethanol 200° proof | 0.00 | 0.00 | 1.0 | 15.0 | 1.0 | 15.0 |
| TOTAL | 100.0 | 100.0 | 100.0 | 100.0 | 100.0 | 100.0 |
| Viscosity (cps) at 75° F | 63 | 1320 | 60 | 30 | 66 | 33 |

TABLE 3-continued

FORMULATIONS CONTAINING CRITICAL LIMITS OF LECITHIN AND ETHANOL

| Formulation | 16 | 17 | 18 | 19 | 20 | 21 |
|---|---|---|---|---|---|---|
| Solubility Characteristics | clear liquid | heavy viscous liquid | clear solution | (b) | clear solution | (b) |

The foregoing tables show that the incorporation of more than 15 percent pure ethyl alcohol into the system results in a higher viscosity, and a two phase system. The tables show that when the lecithin concentration is increased, the viscosity of the product increases. When the lecithin level was increased to more than 20 percent in the product, it was noticed that a slight amount of phosphatides had separated out upon prolonged standing. The product formulation utilized for non-stick purposes, does not require more than 12 percent lecithin in the product.

The viscosity of formulations for discharge from pump dispensers is preferably less than 40 centipoises (cps). The viscosity of formulations for discharge from spray containers, or squeeze bottles, is preferably less than 60 cps. Such viscosities may be achieved with this invention as is shown in Tables 1–3.

Based upon the foregoing data, the lecithin concentration can be between 3 to 12 percent in the formulations of the present invention.

The solubility characteristics of various formulations of soybean oil, and various concentrations of ethanol with lecithin at 3 and 12 percent concentrations were determined and are shown in Tables 4, 5 and 6.

From the experimental data shown in Table 4, it was inferred that 180° and lower proof alcohols cannot be utilized in the practice of this invention. From Table 6 it was inferred that the critical upper limit for 190° proof alcohol in conjunction with the present invention is 8 percent by weight.

Without wishing to be bound by a theory of operation, it is believed that one of the limiting factors of the invention is the amount of water introduced into the system with the ethyl alcohol. A formulation containing 8 percent by weight of 190° proof ethyl alcohol as used in Table 6 contains 0.606 percent by weight of water (0.08 × 0.07577). From Table 6, it may be inferred that about 0.60 percent by weight of water is the upper limit for a vegetable oil-ethyl alcohol formulation containing 12 percent by weight of lecithin. A formulation containing 5 percent by weight of 190° proof ethyl alcohol as used in Table 5, contains 0.379 percent by weight of water (0.05 × 0.07577). From Table 5, it may be inferred that about 0.4 percent by weight of water is the upper limit for a vegetable oil-ethyl alcohol formulation containing 3 percent by weight of lecithin.

Within these critical limits, ethyl alcohol of somewhat less than 190° proof may be utilized in reduced amounts. The water content of 180° proof ethyl alcohols is 14.311 percent by weight and that of 170° proof ethyl alcohol is 20.559 percent by weight. The amount of lower proof alcohol utilized must be greatly reduced (7.577/14.311 or 7.577/20.559) and the benefits of the use of ethyl alcohol are similarly greatly reduced. Accordingly, it is preferred that the ethyl alcohol be at least 190° proof.

TABLE 4

FORMULATIONS CONTAINING VARIOUS PROOF ALCOHOL

| FORMULATION Ingredients | Set 1 | Set 2 | Set 3 | Set 4 |
|---|---|---|---|---|
| Soybean oil | 96.0 | 87.0 | 82.0 | 73.0 |
| Lecithin (50% Phosphatides solids) | 3.0 | 12.0 | 3.0 | 12.0 |
| Various Proof Alcohols (190,180, 160, 120, 100 and 50 proof) | 1.0 | 1.0 | 15.0 | 15.0 |
| Solubility characteristics at 70° F | 190 proof is a clear product. Rest of the formulations are separated, and non-clear products. | 190 proof is a clear product. Rest of the formulations are separated thick, and non-clear products. | All formulations are separated non-clear products. | All formulations are separated, thick, non-clear products. 190 proof formulation appeared thinnest. |

TABLE 5

FORMULATIONS CONTAINING 3w/o LECITHIN AND 190° PROOF ALCOHOL

| FORMULATION | 1 | 2 | 3 | 4 | 5 | 6 |
|---|---|---|---|---|---|---|
| Soybean oil | 96.0 | 94.0 | 92.0 | 91.0 | 90.0 | 82.0 |
| Lecithin (50% phosphatides solids) | 3.0 | 3.0 | 3.0 | 3.0 | 3.0 | 3.0 |
| 190° proof pure ethyl alcohol | 1.0 | 3.0 | 5.0 | 6.0 | 7.0 | 15.0 |
| Total | 100.0 | 100.0 | 100.0 | 100.0 | 100.0 | 100.0 |
| Solubility characteristics at 70° F | clear solution | clear solution | clear solution | separate cloudy layer on top, upon shaking turns cloudy | separate cloudy layer on top, upon shaking turns cloudy | separate cloudy layer on top, upon shaking turns cloudy |

TABLE 6

FORMULATIONS CONTAINING 12w/o LECITHIN AND 190° PROOF ALCOHOL

| FORMULATION | 1 | 2 | 3 | 4 | 5 | 6 | 7 | 8 |
|---|---|---|---|---|---|---|---|---|
| Soybean oil | 87.0 | 85.0 | 83.0 | 82.0 | 81.0 | 80.0 | 79.0 | 73.0 |
| Lecithin (50% phosphatides solids) | 12.0 | 12.0 | 12.0 | 12.0 | 12.0 | 12.0 | 12.0 | 12.0 |
| 190° proof pure ethyl alcohol | 1.0 | 3.0 | 5.0 | 6.0 | 7.0 | 8.0 | 9.0 | 15.0 |
| Total | 100.0 | 100.0 | 100.0 | 100.0 | 100.0 | 100.0 | 100.0 | 100.0 |
| solubility characteristic at 70° F | clear solution | clear solution | clear solution | clear solution | clear solution | clear solution | (d) | (d) |

(d) Separate cloudy layer on top, upon shaking, turns cloudy.

Food grade lecithin is obtained from soybeans. It is a complex mixture of acetone-insoluble phosphatides which consist chiefly of phosphatidyl choline, phosphatidyl ethanolamine, phosphatidyl serine, and phosphatidyl inositol, combined with various amounts of other substances such as triglycerides, fatty acids, and carbohydrates. Refined grades of lecithin may contain any of these components in varying proportions and combinations depending on the type of fractionation used. In its oil-free form, the preponderance of triglycerides and fatty acids are removed and the product contains 90 percent or more of soy phosphatides representing all or certain fractions of the total phosphatide complex. The consistency of both natural grades and refined grades of lecithin may vary from plastic to fluid, depending upon free fatty acid and soybean oil content and the presence or absence of other diluents. Its color varies from light yellow to brown depending upon whether it is bleached or unbleached. It is odorless or has a characteristic, slight nut-like odor and a bland taste. Edible diluents, such as cocoa butter and vegetable oils, often replace soybean oil to improve functional and flavor characteristics. Lecithin is only partially soluble in water, but it readily hydrates to form emulsions. The oil-free phosphatides are soluble in fatty acids, but are practically insoluble in fixed oils. When all soy phosphatide fractions are present, lecithin is partially soluble in alcohol, and practically insoluble in acetone. The acetone-insoluble matter (phosphatides) are not less than 50 percent. The acid value is not more than 36. Benzene-insoluble matter is not more than 0.3 percent. Water is not more than 1.5 percent.

Natural lecithin is available commercially in a number of grades containing 50 to 54 percent of phosphatides dissolved in soybean oil, varying in viscosity from very fluid to plastic (heavy bodied) and may be bleached or unbleached. Hydroxylated lecithin is lecithin which has been modified to increase lecithin's hydrophilic properties and may contain 66–72 percent phosphatides. Powdered and granular lecithin is substantially free of soybean oil and is produced from natural lecithin or lecithin fractions and may contain 95 percent phosphatides.

Natural lecithin was used in obtaining the data of the foregoing tables. The applicability of the present invention to hydroxylated lecithin and powdered and granulated lecithin was determined in the experimentation shown in the following tables. The solubility characteristics of various formulations of soybean oil, and 200° proof and 190° proof pure ethyl alcohol, with hydroxylated lecithin at 3 and 12 percent concentrations were determined and are shown in Table 7. From Table 7 it was inferred that hydroxylated lecithin can be utilized with the present invention as well as natural fluid lecithin.

TABLE 7

FORMULATIONS CONTAINING HYDROXYLATED LECITHIN

| FORMULATION | 1 | 2 | 3 | 4 | 5 | 6 | 7 | 8 |
|---|---|---|---|---|---|---|---|---|
| Soybean oil | 96.0 | 87.0 | 82.0 | 73.0 | 79.0 | 70 | 92.0 | 83.0 |
| Hydroxylated lecithin Centrolene A (66% phsophatides) | 3.0 | 12.0 | 3.0 | 12.0 | 3.0 | 12 | 3.0 | 12.0 |
| 200° proof ethanol | 1.0 | 1.0 | 15.0 | 15.0 | 18.0 | 18.0 | — | — |
| 190° proof ethanol | — | — | — | — | — | — | 5.0 | 5.0 |
| Total | 100.0 | 100.0 | 100.0 | 100.0 | 100.0 | 100.0 | 100.0 | 100.0 |
| solubility characteristics at 70° F | clear solution | clear solution | Almost clear solution Notice slight separation of alcohol layer on a top. | clear solution | cloudy initially. Upon standing product separates into two layers. Upon shaking turns cloudy. | cloudy initially. Upon standing product separates into two layers. Upon shaking turns cloudy. | clear solution | clear solution |

The solubility characteristics of various formulations of soybean oil, and 200° proof and 190° proof pure ethyl alcohol, with powdered and granular lecithin at 3 and 12 percent concentrations were determined and are shown in Table 8. From Table 8 it was concluded that powdered and granular lecithin can be utilized in the present invention as well as natural fluid lecithin.

TABLE 8

FORMULATIONS CONTAINING POWDERED OR GRANULAR LECITHIN

| FORMULATION Ingredients | 1 | 2 | 3 | 4 | 5 | 6 | 7 | 8 |
|---|---|---|---|---|---|---|---|---|
| Soybean oil | 96.0 | 87.0 | 82.0 | 73.0 | 79.0 | 70.0 | 92.0 | 83.0 |
| Powdered lecithin Centrolex F (90–95% phosphatides) | 3.0 | 12.0 | 3.0 | 12.0 | 3.0 | 12.0 | 3.0 | 12.0 |
| 200° proof ethanol | 1.0 | 1.0 | 15.0 | 15.0 | 18.0 | 18.0 | — | — |
| 190° proof ethanol | — | — | — | — | — | — | 5.0 | 5.0 |
| Total | 100.0 | 100.0 | 100.0 | 100.0 | 100.0 | 100.0 | 100.0 | 100.0 |
| solubility characteristics at 70° F | clear soluton | clear solution | somewhat cloudy. | somewhat cloudy. | product separates into two layers. Upon shaking turns cloudy. | product separates into two layers. Upon shaking turns cloudy. | clear solution | clear solution |

The formulations of the present invention make use of up to twice the concentration of lecithin found in the current marketed lecithin-vegetable oil products. The preferred serving portion size of the product is about one gram as compared to the serving size of about four grams for the currently marketed lecithin-vegetable oil products. The serving size of one gram of the product provides the same anti-stick properties as is found in the much larger serving size of the prior art lecithin-vegetable oil products.

The product of the present invention as discharged from a non-aerosol, squeeze or pump spray bottle is a water clear solution of tiny oil droplets with a light, pleasant, sweet odor. The alcohol odor is practically undetectable. The formulation does not require any flavor, color, or preservatives system. If desired, flavors can be added to mask alcohol odor. The minute oil droplet type coating affords the consumer the aesthetic property of being able to see the quantity of sprayed coating on the cooking surface. Each serving portion of one gram of the present invention contains about 0.01 to 0.15 (preferably 0.05 to 0.1 gram alcohol) grams of ethanol which is rapidly dissipated upon preheating, for instance, at 173° F., on the coated cooking surface, leaving the film of a vegetable oil-lecithin mixture. When preheating is not practical, such as on muffin tins, most of the alcohol is dissipated by high oven heat. Foods prepared using the present product in the majority of cases would not contain any alcohol when cooked according to the baking and frying procedures ordinarily in use. The present product is a 100 percent food product and can be used for pan coating as well as for direct spraying of foods for basting. While the product is especially suited for use in non-aerosol dispensers, its use in aerosol dispensers provides an improved spray pattern.

EXAMPLE I

This example describes the preferred formulation for the present invention in (a) squeeze bottle spray form, and (b) in pump spray form.

The liquid vegetable oil may be soybean oil, corn oil, cottonseed oil, peanut oil, safflower oil, olive oil, and the like. Vegetable oil in the formulation may contain FDA approved anti-oxidants, such as BHA (butylated hydroxyanisole), propyl gallate, and TBHQ (tertiary-butylhydroxyquinone) and may also contain a crystal inhibitor, such as oxystearin, and an antifoam agent, such as methyl silicone.

EXAMPLE II

This example describes the efficacy testing of the formulations of Example I. The results of the efficacy testing indicated that the product is a parity on anti-stick qualities with the current market products. The test was conducted to compare the proposed product with PAM, a popular aerosol vegetable oil containing lecithin, for preventing sticking in casseroles and the like.

A clean, dry, cool Pyrex casserole was sprayed with PAM for three seconds in accord with label directions. A second casserole was sprayed and coated with proposed product (1.0 gm. serving size) and a third casserole was not treated in any way. The same quantity of beef stew was placed into each casserole. A pie crust was prepared and placed on top of the beef stew. The uncooked crust was then pressed against the edge of the casserole. The three casseroles were placed in a freezer and left there for one day. The casseroles were then heated at 350° F. for 60 minutes in a gas oven. After the casseroles were heated, a panel of five persons observed the serving of the beef pot pie from all three casseroles. Each of cleaning was also noted by the same panelists. This test was run in duplicate.

The above test was repeated using chicken tetrazzini which was cooked, placed in the respective casseroles and then frozen as before. The casseroles were then reheated at 350° F. for 60 minutes and evaluated as with the beef pot pie. This test was also run in duplicate.

In a third part of this test, a prepared macaroni and cheese (Kraft) was cooked following the label cooking directions. The macaroni and cheese was then placed in the respective casseroles and frozen as above. The next

| Ingredients | Squeeze Bottle Spray Formulation In Per Cent By Weight | Pump Spray Formulation In Per Cent By Weight |
|---|---|---|
| Liquid vegetable oil | 89.0 | 84.0 |
| Lecithin (50% phosphatides) | 6.0 | 6.0 |
| Pure Ethyl Alcohol | 5.0 | 10.0 |
| TOTAL | 100.0 | 100.0 | day, the casseroles were reheated at 375° F. for one hour and evaluated as described above. This test was run in duplicate.

All three dishes were easily served without sticking from the casseroles treated with proposed product and with PAM. The casseroles were easily cleaned with a sponge and warm soapy water. The foods served easily from untreated casseroles; however, food stuck to the untreated casseroles which required scouring. Similar tests were conducted to compare the no-stick properties of proposed product and PAM when eggs are fried, scrambled, shirred, poached, or cooked in an omelet. In each case, the utensil was sprayed with proposed product (1.0 gm serving size) and with PAM according to label directions. After the cooking was completed, the eggs were turned out of the utensil or removed with a spatula. In no case did the eggs stick, using either the present product or PAM.

EXAMPLE III

This example describes the nutritional content of the formulations of the present invention.

The squeeze bottle and pump spray formulations (example I) consist of vegetable oil and lecithin solids which are the basis for the fat content and resulting caloric level. Experimental testing using an average size frying pan indicates that a 1.0 gram spray portion is sufficient to achieve anti-stick properties and is, therefore, the basis for determining the one gram of vegetable oil-lecithin coating per portion.

The content of calories, proteins, carbohydrates, fats and cholesterol was determined from the "Composition of Foods," Agriculture Handbook No. 8, item 1401—'-'Oils, Salad or Cooking".

It was found that the average spray portion contained the following:

| | |
|---|---|
| Calories | 8 |
| Protein | 0 gm |
| Carbohydrate | 0 gm |
| Fat | 1 gm |
| Cholesterol (0mg/100gm) | 0 gm |

It was also found that the average spray portion contains less than 2 percent of the U.S. recommended daily requirement for protein, vitamin A, vitamin C, thiamine, riboflavin, niacin, calcium and iron.

EXAMPLE IV

This example describes stability tests which were conducted with samples of the products stored in low density polyethylene bottles under the following conditions:

1. 130° F. temperature
2. 100° F. temperature
3. Ambient temperature
4. Refrigerator temperature (40° degrees F.) (RT).

One month and six month stability test results for the product at all temperatures demonstrated that the product is stable. The following table refers to the average weight losses (in low density polyethylene bottles) at various temperatures:

| TEMP | TIME | AVERAGE PER CENT WEIGHT LOSS |
|---|---|---|
| 130° F | 1 month | 1.6 |
| 100° F | 1 month | 0.5 |
| RT | 1 month | 0.2 |
| RT | 6 months | 0.5 |
| 40° F | 6 months | 0.1 |

The product shelf life is estimated to be approximately two years, with average weight loss of about two percent by weight of the total ethanol content. This amount of weight loss would not interfere with the product functionality for squeeze bottle spraying. The formulation is suitable for storing and dispensing from plastic bottles, such as polyethylene bottles.

The storage of the pump spray product described in example I, in glass bottles did not result in weight loss.

EXAMPLE V

This example illustrates the microbiological testing which was carried out on the present product.

The proposed product is anhydrous and, therefore, bacterial growth is not expected. However, stability samples were tested biologically and demonstrated its safety. The microbiological studies consisted of the following:

1. Total standard plate count.
2. Coliform plate count
3. E. Coli
4. Staph coagulase
5. Yeast and Mold Count The Bacteriological testing was performed as described in the Food and Drug Administration Bacteriological Analytical Manual for Foods, July, 1976.

While the product is especially suited for use in non-aerosol dispensers, its use in aerosol dispensers provides an improved spray pattern.

What is claimed is:

1. An edible composition comprising 3 to 12 percent by weight lecithin and 1 to 15 percent by weight of 190° to 200° proof ethyl alcohol, the remainder being substantially all liquid vegetable oil provided that when 190° proof ethyl alcohol is used the alcohol concentration is 1 to 8 percent in compositions containing the maximum of 12 percent lecithin and 1 to 5 percent in compositions containing the minimum of 3 percent lecithin.

2. The composition of claim 1 further containing minor amounts of an anti-oxidant.

3. The composition of claim 1 wherein lecithin is present in the amount of 6 percent by weight, and pure ethyl alcohol is present in the amount of 5–10 percent by weight, the remainder being substantially all vegetable oil.

4. The composition of claim 1 where the viscosity is less than 60 centipoises at a temperature of 66° F.

5. The composition of claim 1 where the viscosity is less than 40 centipoises at a temperature of 82° F.

6. An edible composition comprising 3 to 12 percent by weight of lecithin and 1 to 15 percent of 190° to 200° proof ethyl alcohol, the remainder being substantially all vegetable oil provided that the maximum water content is about 0.6 percent when the lecithin content is about 12 percent, and provided that the maximum water content is about 0.4 percent when the lecithin content is about 3 percent.

7. A method of reducing the viscosity of a vegetable oil-lecithin mixture to make it suitable for use in a non-aerosol, squeeze and pump spray type dispenser comprising adding to vegetable oil with mixing from 3 to 12 percent by weight of lecithin and from 1 to 15 percent by weight of pure ethyl alcohol to make a one phase system.

8. The method of claim 7 where the viscosity is less than 60 centipoises at a temperature of 66° F.

9. An edible pan release formulation having a high density of lecithin and a corresponding high level of anti-stick properties comprising:
 a. 3 to 12 percent lecithin
 b. 1 to 15 percent pure ethyl alcohol
 c. 73 to 96 percent vegetable oil.

* * * * *